(12) United States Patent
Mikami et al.

(10) Patent No.: US 11,210,644 B2
(45) Date of Patent: Dec. 28, 2021

(54) SELF-SERVICE POS TERMINAL DEVICE

(71) Applicant: NEC Platforms, Ltd., Kawasaki (JP)

(72) Inventors: Hayato Mikami, Kanagawa (JP);
Satoru Sugiyama, Kanagawa (JP);
Akihisa Iwata, Kanagawa (JP);
Motohisa Watanabe, Kanagawa (JP);
Misako Motohashi, Kanagawa (JP);
Takuro Nagano, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 16/975,935

(22) PCT Filed: Feb. 13, 2019

(86) PCT No.: PCT/JP2019/004962
§ 371 (c)(1),
(2) Date: Aug. 26, 2020

(87) PCT Pub. No.: WO2019/167614
PCT Pub. Date: Sep. 6, 2019

(65) Prior Publication Data
US 2020/0410469 A1 Dec. 31, 2020

(30) Foreign Application Priority Data
Feb. 28, 2018 (JP) .............................. JP2018-034804

(51) Int. Cl.
*G06Q 20/18* (2012.01)
*G06K 7/10* (2006.01)
(Continued)

(52) U.S. Cl.
CPC ......... *G06Q 20/18* (2013.01); *G06K 7/10297* (2013.01); *G06Q 20/208* (2013.01); *G06Q 30/0633* (2013.01)

(58) Field of Classification Search
CPC .. G06Q 20/18; G06Q 20/208; G06Q 30/0633; G06K 7/10297; G06K 7/10425; G07G 1/009
See application file for complete search history.

(56) References Cited

U.S. PATENT DOCUMENTS 6,809,645 B1 * 10/2004 Mason ................. G08B 13/246
235/385
6,866,193 B1 * 3/2005 Shimizu ............. G01G 19/4144
186/61

(Continued)

FOREIGN PATENT DOCUMENTS

| CN | 1985281 A | 6/2007 |
| CN | 203805951 U | 9/2014 |

(Continued)

OTHER PUBLICATIONS

Inman, J. Jeffrey, and Hristina Nikolova. "Shopper-Facing Retail Technology: A Retailer Adoption Decision Framework Incorporating Shopper Attitudes and Privacy Concerns."Journal of retailing 93.1 (2017): 7-28. Web. (Year: 2017).*

(Continued)

*Primary Examiner* — Ashford S Hayles
(74) *Attorney, Agent, or Firm* — Sughrue Mion, PLLC

(57) ABSTRACT

A self-service POS terminal device comprises a first antenna and a second antenna, and reads, via each of the first antenna and the second antenna, commodity-related information stored in IC tags of commodities. The first antenna is positioned at a position for reading the IC tags of the commodities loaded in a shopping basket at a prescribed position, and forms a first reading area. The second antenna is positioned at a position for reading the IC tags of the commodities taken out from the shopping basket at the prescribed position and put into a shopping bag, and forms a second reading area.

9 Claims, 11 Drawing Sheets

(51) Int. Cl.
*G06Q 20/20* (2012.01)
*G06Q 30/06* (2012.01)

(56) References Cited

U.S. PATENT DOCUMENTS

| | | | | |
|---|---|---|---|---|
| 7,780,081 | B1* | 8/2010 | Liang | G06Q 30/0633 235/383 |
| 9,445,230 | B1* | 9/2016 | Sipher | H04W 4/021 |
| 9,892,289 | B2* | 2/2018 | Zumsteg | G07G 1/009 |
| 10,043,119 | B1 | 8/2018 | Egan | |
| 10,133,933 | B1* | 11/2018 | Fisher | H04N 5/247 |
| 10,402,798 | B1* | 9/2019 | Varma | G06Q 20/3224 |
| 10,796,305 | B1* | 10/2020 | Farrow | G06Q 20/4012 |
| 10,853,595 | B2* | 12/2020 | Sakurai | G06K 7/10356 |
| 2006/0261161 | A1* | 11/2006 | Murofushi | G06Q 30/06 235/383 |
| 2006/0261181 | A1 | 11/2006 | Murofushi et al. | |
| 2007/0138271 | A1* | 6/2007 | Murofushi | G07G 1/0045 235/383 |
| 2012/0316963 | A1* | 12/2012 | Moshfeghi | G06Q 20/327 705/14.58 |
| 2013/0024308 | A1* | 1/2013 | Ramaswamy | G06Q 20/3272 705/18 |
| 2013/0030931 | A1* | 1/2013 | Moshfeghi | H04W 4/80 705/16 |
| 2014/0012688 | A1* | 1/2014 | McGuinness | H04W 4/021 705/16 |
| 2014/0159869 | A1* | 6/2014 | Zumsteg | G07G 1/009 340/10.1 |
| 2015/0048164 | A1* | 2/2015 | Slutsky | G06K 7/10732 235/440 |
| 2015/0302379 | A1* | 10/2015 | Terahara | G07G 1/0018 235/375 |
| 2016/0012379 | A1* | 1/2016 | Iwai | G06Q 10/063114 705/7.15 |
| 2016/0019514 | A1* | 1/2016 | Landers, Jr. | G06Q 20/202 705/20 |
| 2016/0117612 | A1* | 4/2016 | Hong | G06Q 10/02 705/5 |
| 2017/0083902 | A1* | 3/2017 | Gilbey | G06Q 20/403 |
| 2017/0140360 | A1* | 5/2017 | Naito | G06K 9/00771 |
| 2017/0236189 | A1* | 8/2017 | Srinath | G06Q 30/0185 705/26.81 |
| 2017/0372562 | A1* | 12/2017 | Terahara | G07G 1/0072 |
| 2018/0181961 | A1* | 6/2018 | Nair | G06Q 20/3223 |
| 2018/0232796 | A1* | 8/2018 | Glaser | G06Q 30/0635 |
| 2018/0247283 | A1* | 8/2018 | Milici | G06Q 20/202 |
| 2018/0293612 | A1* | 10/2018 | Yuasa | G07G 1/14 |
| 2018/0349393 | A1* | 12/2018 | Oberdorfer | G06Q 50/01 |
| 2018/0373928 | A1* | 12/2018 | Glaser | G06F 9/54 |
| 2019/0102825 | A1* | 4/2019 | Jaber | G06Q 20/208 |
| 2019/0114488 | A1* | 4/2019 | Glazer | G06Q 20/206 |
| 2019/0138772 | A1* | 5/2019 | Sakurai | G06K 7/10366 |
| 2019/0156506 | A1* | 5/2019 | Fisher | G06K 9/00771 |
| 2020/0042972 | A1* | 2/2020 | Wang | G06Q 20/308 |
| 2020/0090254 | A1* | 3/2020 | Terase | G06Q 30/0635 |
| 2020/0193403 | A1* | 6/2020 | Jabbour | G06Q 20/3278 |
| 2020/0202683 | A1* | 6/2020 | Gao | A47F 9/048 |
| 2020/0242580 | A1* | 7/2020 | Imamura | G07G 3/003 |
| 2020/0258070 | A1* | 8/2020 | Fujisawa | G07G 1/0036 |
| 2020/0265405 | A1* | 8/2020 | Murofushi | G06Q 20/208 |
| 2020/0302257 | A1* | 9/2020 | Oishi | G06Q 20/3278 |
| 2020/0402139 | A1* | 12/2020 | Higa | G06Q 20/18 |
| 2021/0182921 | A1* | 6/2021 | Onkels | G06Q 30/0633 |

FOREIGN PATENT DOCUMENTS

| | | | | |
|---|---|---|---|---|
| CN | 107545665 | A | | 1/2018 |
| CN | 207008816 | U | | 2/2018 |
| EP | 3454308 | A1 * | 3/2019 | G06Q 20/208 |
| JP | H07-225881 | A | | 8/1995 |
| JP | 2005-141648 | A | | 6/2005 |
| JP | 2007-157054 | A | | 6/2007 |
| JP | 2008-027192 | A | | 2/2008 |
| JP | 2010-122755 | A | | 6/2010 |
| JP | 2010-267010 | A | | 11/2010 |
| JP | 2014-067071 | A | | 4/2014 |
| JP | 2015-207116 | A | | 11/2015 |
| JP | 2018-005265 | A | | 1/2018 |
| JP | 2018-181253 | A | | 11/2018 |
| WO | 2014/038303 | A1 | | 3/2014 |

OTHER PUBLICATIONS

Forehand, Kevin A. "Exploring Wal-Mart Customer Acceptance of Radio Frequency Identification Technology at the Point-of-Sale: A Case Study." ProQuest Dissertations Publishing, 2017. Print. (Year: 2017).*
International Search Report for PCT Application No. PCT/JP2019/004962, dated Mar. 19, 2019.
English translation of Written opinion for PCT Application No. PCT/JP2019/004962, dated Mar. 19, 2019.
Japanese Office Action for JP Application No. 2018-034804 dated Feb. 20, 2019 with English Translation.
Japanese Office Action for JP Application No. 2019-110996 dated Jul. 31, 2019 with English Translation.
Chinese Office Action for CN Application No. 201980015828.5 dated Sep. 3, 2021 with English Translation.

* cited by examiner

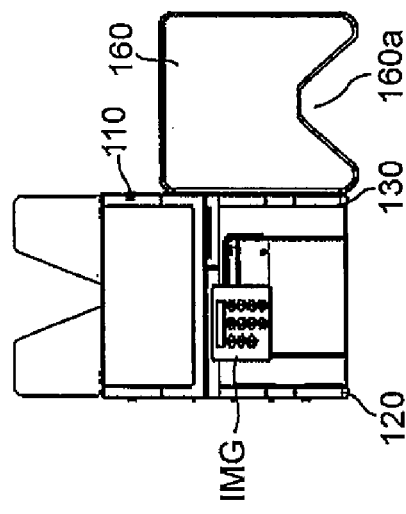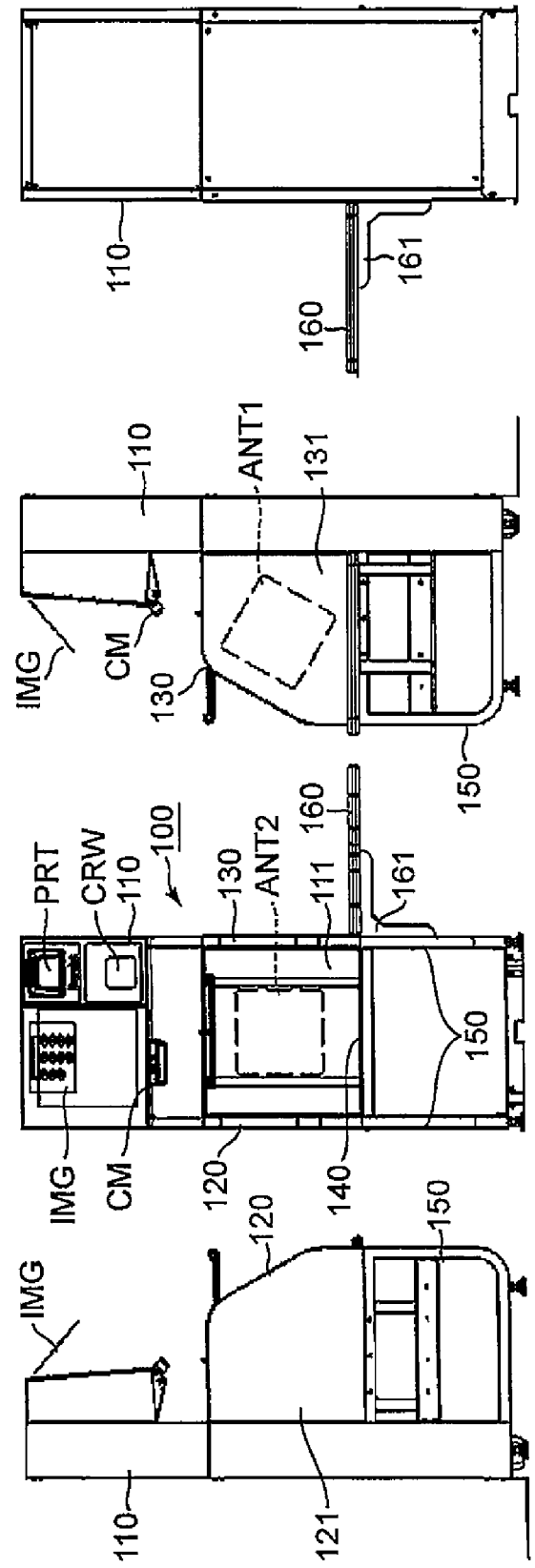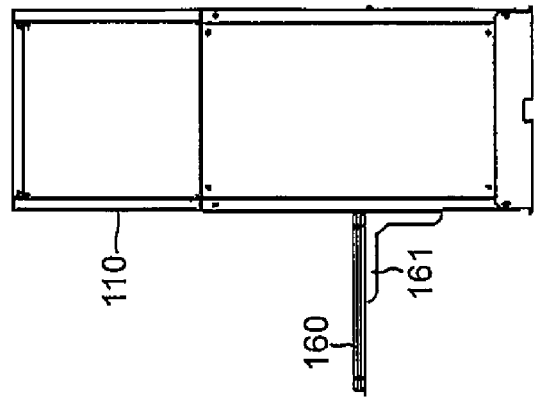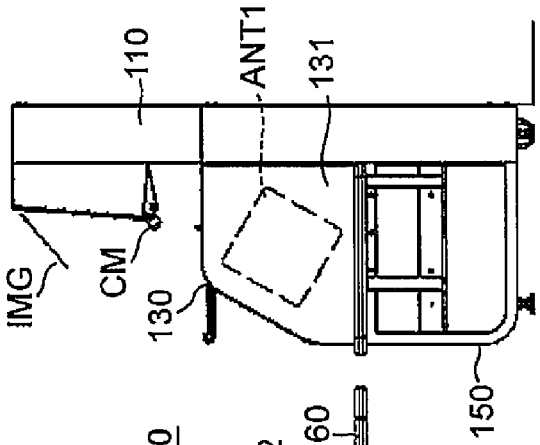

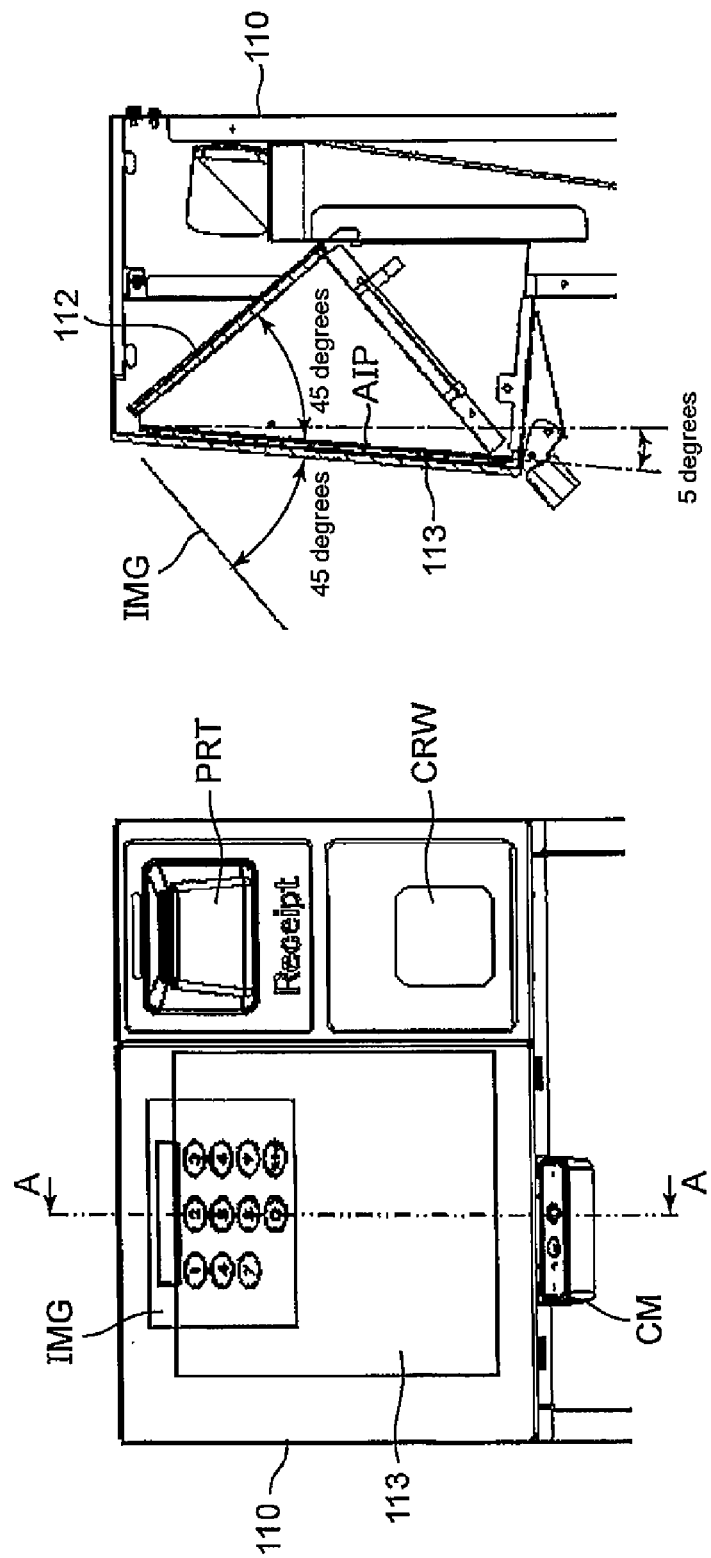

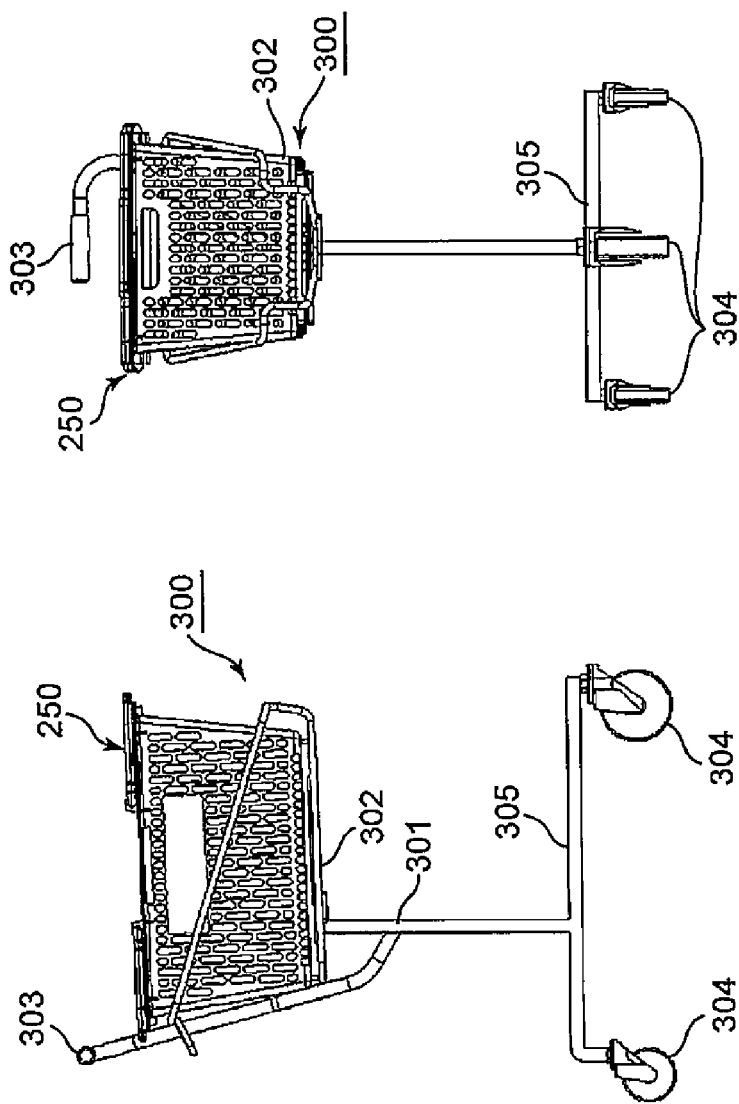

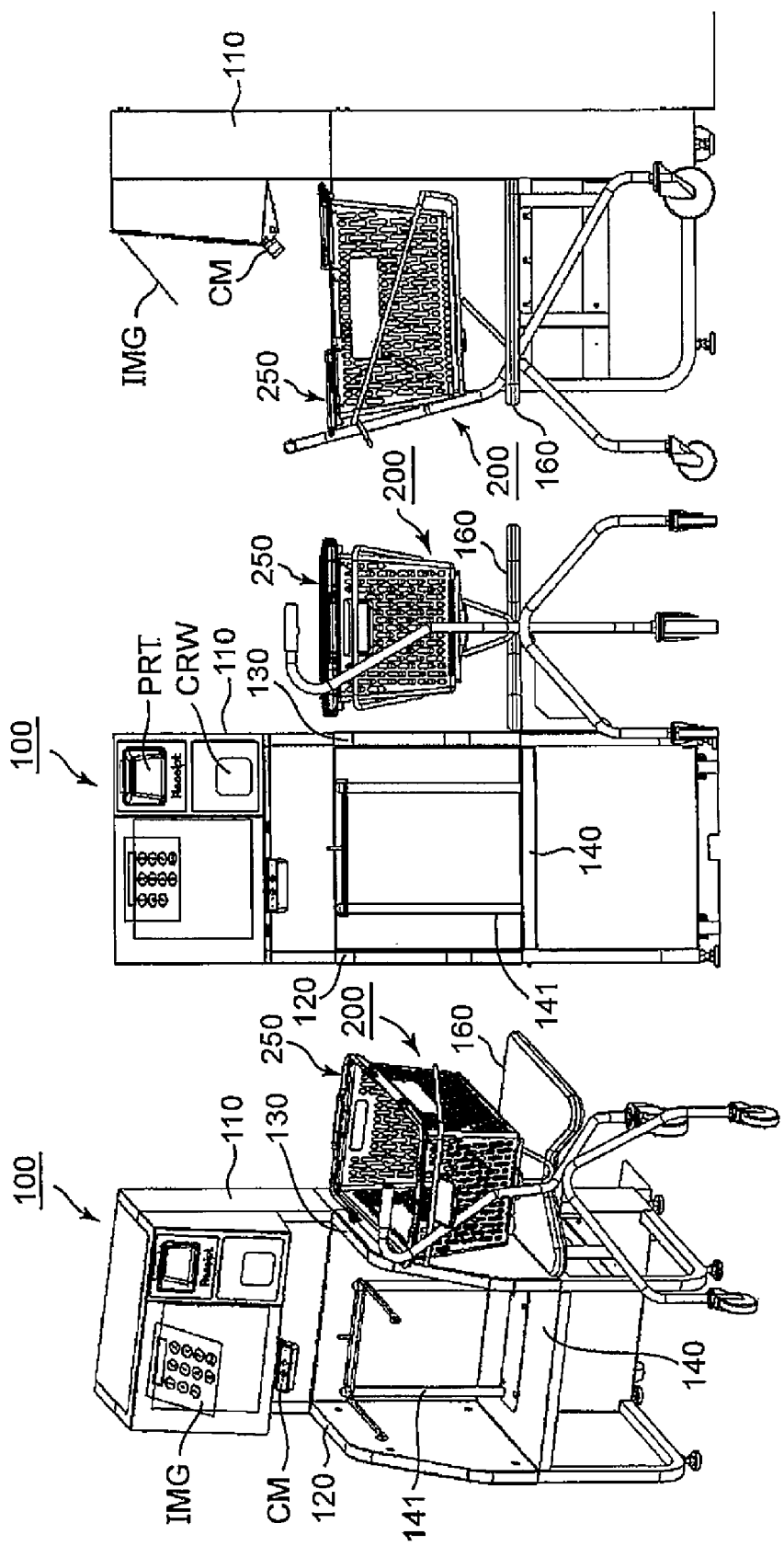

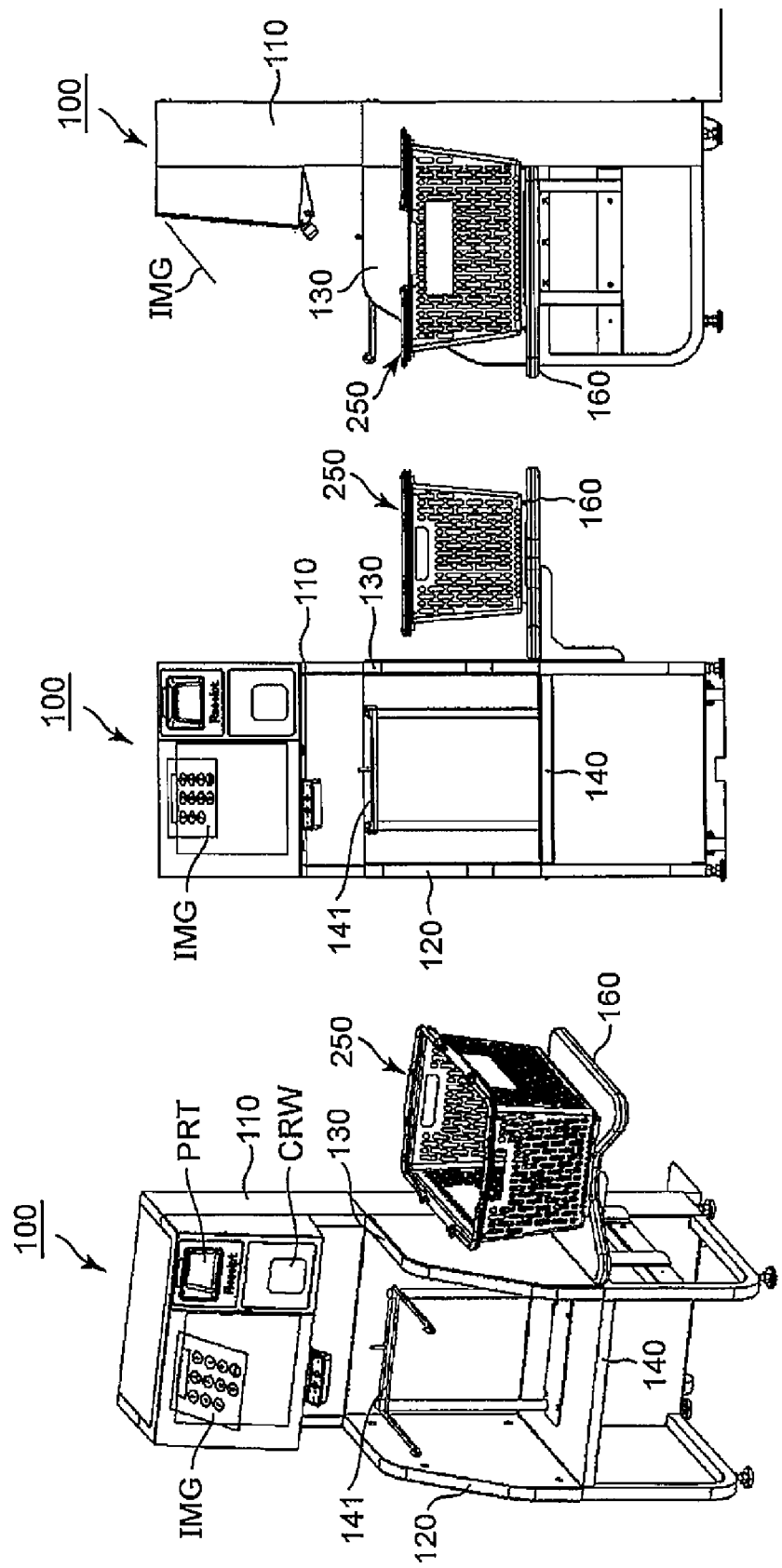

SELF-SERVICE POS TERMINAL DEVICE

This application is a National Stage Entry of PCT/JP2019/004962 filed on Feb. 13, 2019, which claims priority from Japanese Patent Application 2018-034804 filed on Feb. 28, 2018, the contents of all of which are incorporated herein by reference, in their entirety.

TECHNICAL FIELD

This invention relates to a self-service POS terminal device.

BACKGROUND ART

As a POS (Point of Sales) terminal device installed in a shop, such as a supermarket, to register commodities to be purchased by a customer and to perform checkout, a so-called self-service POS terminal device is known. In the self-service POS terminal device, the customer him/herself performs commodity registration of the commodities to be purchased and performs checkout.

Patent Document 1 discloses a wireless tag reading and processing device as one example of the self-service POS terminal device. With the wireless tag reading and processing device, it is possible for a customer to perform commodity registration and make settlement while commodities are kept loaded in a shopping cart.

PRIOR ART LITERATURE(S)

Patent Literature(s)

Patent Literature 1: JP 2010-267010 A

SUMMARY OF THE INVENTION

Problem to be Solved by the Invention

However, in the wireless tag reading and processing device, the commodity registration is performed while the commodities to be purchased are kept loaded in the shopping cart. Therefore, if a plurality of commodities overlap one another, wireless tags (IC tags) of some commodities may not be read depending on a state of overlapping. When the wireless tags (IC tags) of those commodities cannot be read, the commodity registration is not performed therefor. This results in a trouble that settlement (checkout) is completed although there are unregistered commodities.

It is an object of this invention to provide a self-service POS terminal device for reading an IC tag of a commodity, which is free from risk of causing a trouble that checkout is completed although there is an unregistered commodity.

Means to Solve the Problem

According to one aspect of this invention, there is provided a self-service POS terminal device having a first antenna and a second antenna and configured to read, through each of the first antenna and the second antenna, commodity-related information stored in an IC tag of a commodity, wherein the first antenna is disposed at a position to read the IC tag of the commodity loaded in a shopping basket at a predetermined position and forms a first reading area whereas the second antenna is disposed at a position to read the IC tag of the commodity taken out from the shopping basket at the predetermined position and put into a shopping bag and forms a second reading area.

Effect of the Invention

According to this invention, it is possible to provide a self-service POS terminal device for reading an IC tag of a commodity, which is free from risk of causing a trouble that checkout is completed although there is an unregistered commodity.

BRIEF DESCRIPTION OF THE DRAWINGS

FIGS. 2A, 2B, 2C, 2D, and 2E are a front view, a top view, a left side view, a right side view, and a rear view of the self-service POS terminal device in FIG. 1, respectively;

FIGS. 3A and 3B are a front view of an upper part of the self-service POS terminal device in FIG. 1 and a sectional view taken along a line A-A in FIG. 3A, respectively;

FIGS. 6A and 6B are a right side view and a rear side view of another example of the shopping cart with the shopping basket mounted thereon, respectively;

FIGS. 7A, 7B, and 7C are a perspective view, a front view, and a right side view of the self-service POS terminal device when the shopping cart, on which the shopping basket loaded with commodities is mounted, is advanced to a position to perform commodity registration and checkout, respectively;

FIGS. 8A, 8B, and 8C are a perspective view, a front view, and a right side view of the self-service POS terminal device when the shopping basket loaded with the commodities is placed on a shopping basket placing portion, respectively;

MODE FOR EMBODYING THE INVENTION

Referring to FIGS. 1 to 11, an embodiment of this invention will be described.

Figure 1:
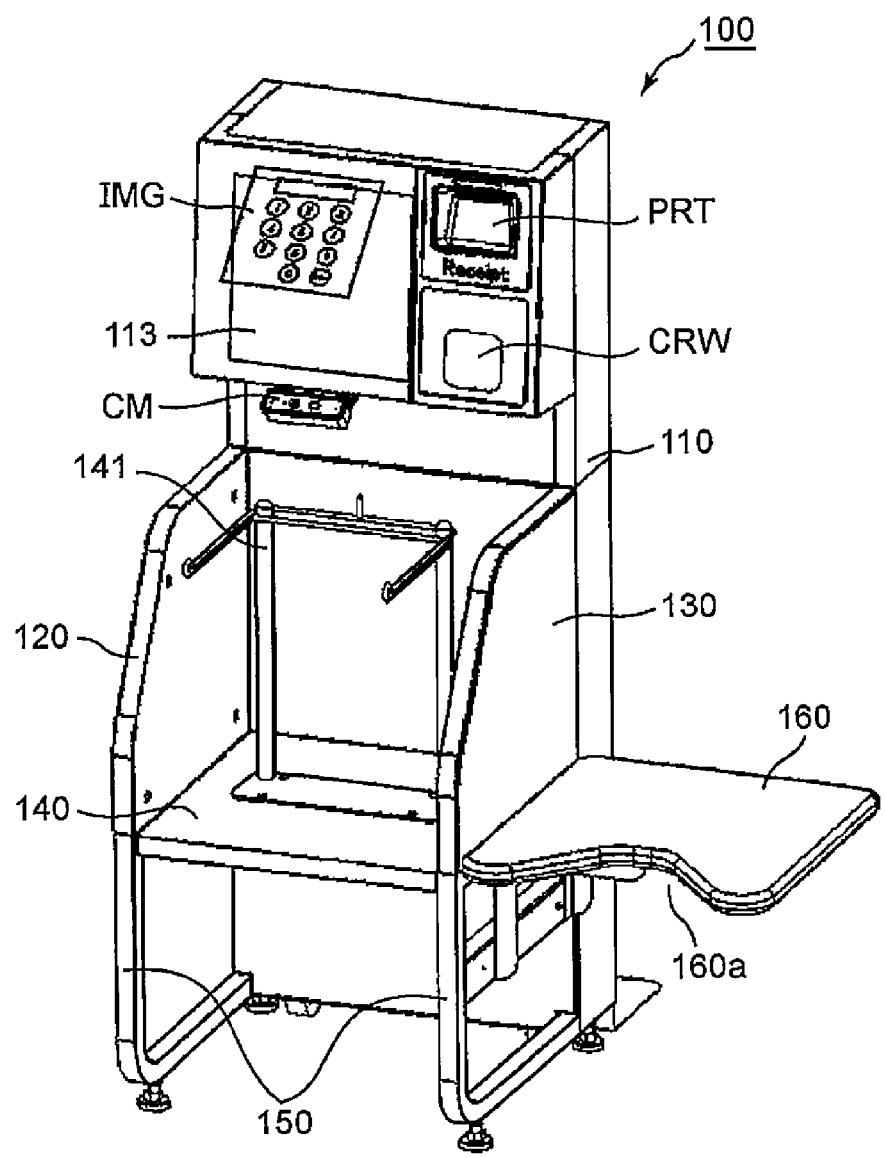
FIG. 1 is a perspective view of a self-service POS terminal device according to an embodiment of this invention.
Figure 4:
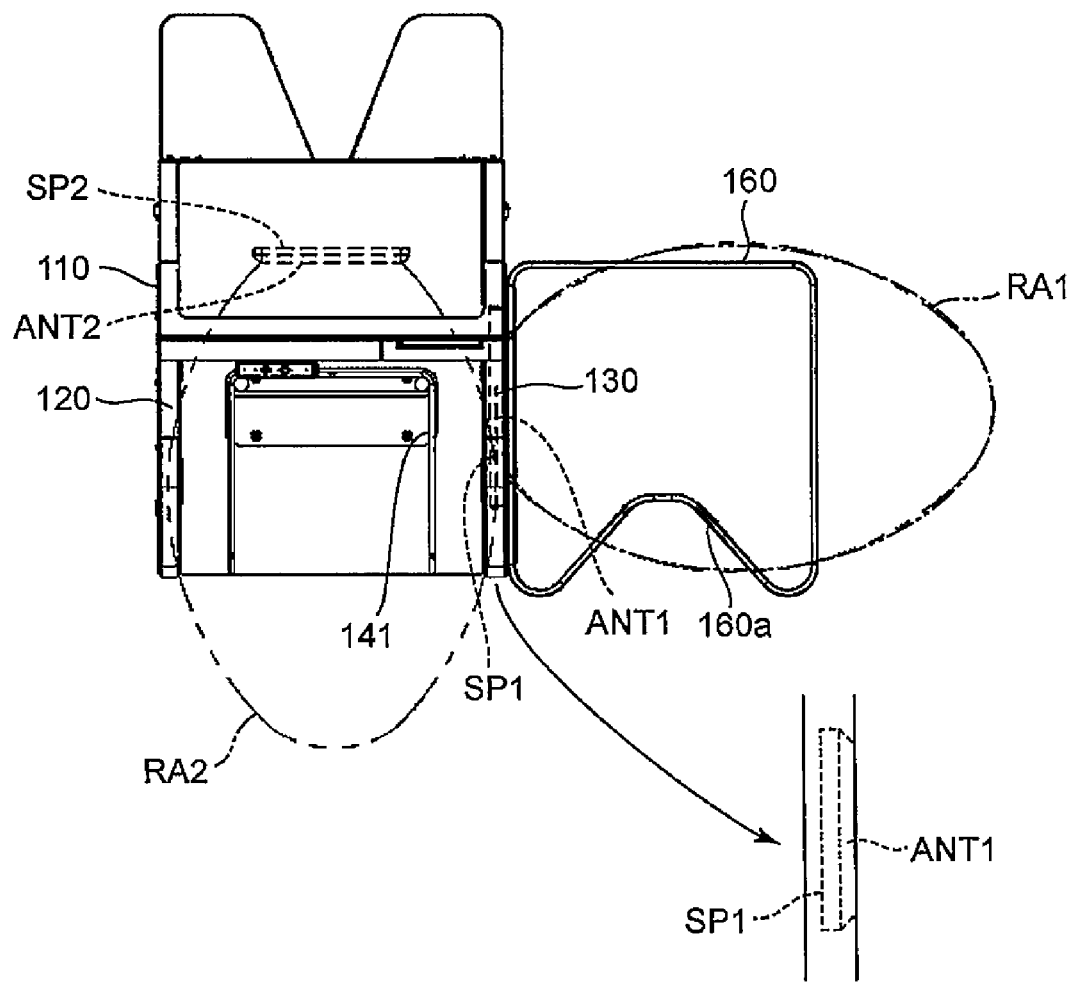
FIG. 4 is a top view of the self-service POS terminal device in FIG. 1 with a first reading area and a second reading area shown by long-dashed double-dotted lines.
Figure 5C:
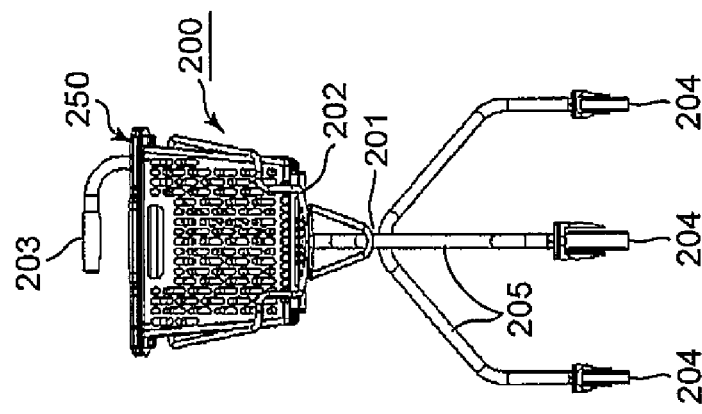
FIGS. 5A, 5B, and 5C are a perspective view, a right side view, and a rear view of a shopping cart with a shopping basket mounted thereon, which is applicable to the embodiment of this invention, respectively.
Figure 5B:
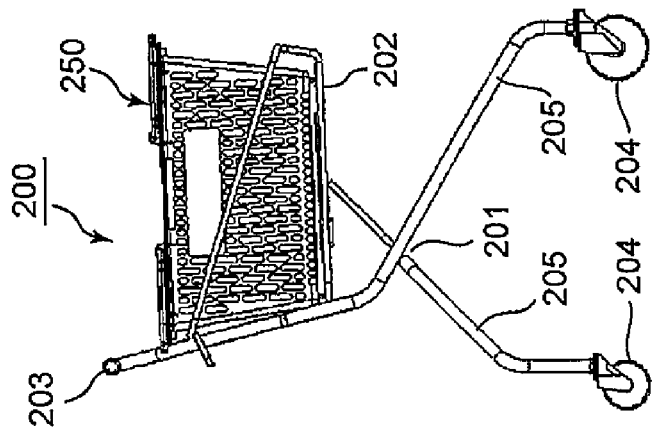
Figure 5A:
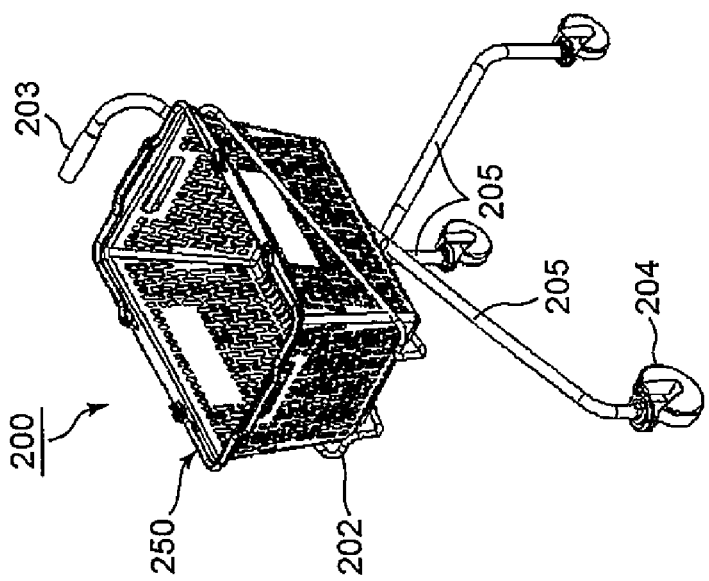
Figure 9:
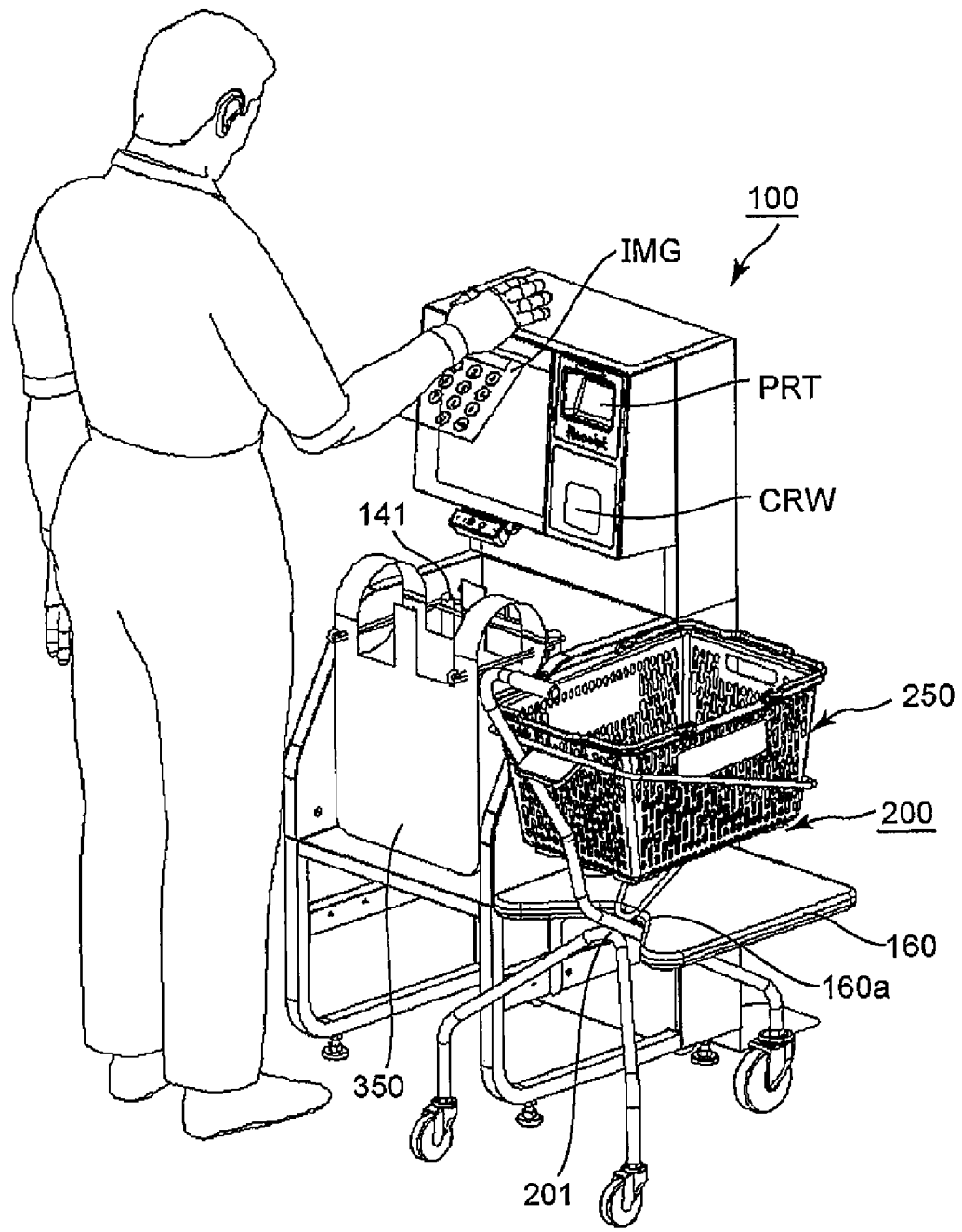
FIG. 9 is a perspective view for illustrating a state where a customer performs the commodity registration and the checkout at the self-service POS terminal device.

FIG. 1 is a perspective view of a self-service POS terminal device according to the embodiment of this invention. FIG. 2A is a front view of the self-service POS terminal device, FIG. 2B is a top view, FIG. 2C is a left side view, FIG. 2D is a right side view, and FIG. 2E is a rear view. FIG. 3A is a front view of an upper part of the self-service POS terminal device, and FIG. 3B is a sectional view taken along a line A-A in FIG. 3A. FIG. 4 is a top view of the self-service POS terminal device with a first reading area and a second reading area shown by long-dashed double-dotted lines. FIG. 5A is a perspective view of a shopping cart (hereinafter abbreviated to "cart") with a shopping basket mounted thereon, FIG. 5B is a right side view, and FIG. 5C is a rear view. FIG. 6A is a right side view of another example of the cart and FIG. 6B is a rear view. FIG. 7A is a perspective view of the self-service POS terminal device when the cart, on which the shopping basket loaded with commodities (not shown) is mounted, is advanced to a position to perform commodity registration and checkout, FIG. 7B is a front view, and FIG. 7C is a right side view. FIG. 8A is a perspective view of the self-service POS terminal device when the shopping basket loaded with the commodities (not shown) is placed on a shopping basket placing portion, FIG. 8B is a front view, and FIG. 8C is a right side view. FIG. 9 is a perspective view for illustrating a state where a customer performs commodity registration and checkout at the self-service POS terminal device.

In the following description, putting the commodities into the shopping basket will be called "loading", putting the shopping basket on the cart will be called "mounting", and putting the shopping basket on the shopping basket placing portion of the self-service POS terminal device will be called "placing" so as to discriminate one from another. A front side of the self-service POS terminal device may be called a "customer side" and an opposite side thereto may be called a rear side.

As shown in FIGS. 1 and 2A to 2E, the self-service POS terminal device 100 comprises a main body portion 110 of the device, a left side plate portion 120, a right side plate portion 130, a bottom plate portion 140, a frame portion 150, and the shopping basket placing portion 160. The self-service POS terminal device 100 is constructed by plates and frames made of metal (iron, aluminum, or the like) except a part thereof.

A dotted line in the right side view FIG. 2D represents a first antenna ANT1 built in the right side plate portion 130 whereas a dotted line in the front view of FIG. 2A represents a second antenna ANT2 built in the main body portion 110. As the first antenna ANT1 and the second antenna ANT2, for example, a RFID (Radio Frequency Identification) antenna may be used. To a surface of the main body portion 110 which faces the left side plate portion 120 and the right side plate portion 130, an outside surface of the left side plate portion 120, and an outside surface of the right side plate portion 130, plastic plates 111, 121, and 131 are attached, respectively.

A printer PRT for outputting a receipt and a noncontact IC card reader/writer (CRW) for reading and writing a noncontact IC card are built in an upper part of the main body portion 110. As illustrated in FIGS. 3A and 3B, an AI (Aerial Imaging) plate AIP for forming an image of a built-in LCD (Liquid Crystal Display) (display device) 112 in the air is attached to the upper part of the main body portion 110. The AI plate AIP is a glass plate or a resin plate. To a front surface of the AI plate AIP, a plastic transparent panel 113 is attached for the purpose of protection.

Herein, the AI plate AIP is attached so as to have an inclination angle of 85 degrees with respect to a horizontal plane. The image of the LCD 112 is formed in the air through the AI plate AIP as depicted by a symbol IMG in FIGS. 3A and 3B. The AI plate AIP and the LCD 112 are arranged so as to form an angle of 45 degrees. The AI plate AIP and the aerial image IMG forms an angle of 45 degrees. The aerial image IMG has an inclination angle of 40 degrees with respect to the horizontal plane. Below the AI plate AIP, a camera as an image pickup device is disposed towards the aerial image IMG in order to detect a position of a fingertip of the customer in the aerial image IMG. The customer can perform input to the self-service POS terminal device by positioning his/her finger at an operation key displayed on an operation screen of the aerial image IMG. The operation screen is displayed as the aerial image IMG and, therefore, causes no obstacle to customer's operations associated with the commodity registration and the checkout. Since the operation screen alone is displayed as the aerial image IMG, a visual field of the customer is prevented from being blocked by a frame formed around the operation screen as in a conventional display device.

A mode of arrangement of a plurality of components and a mode of display illustrated in FIGS. 3A and 3B are merely one example. It is needless to say that this invention is not limited to the mode of arrangement and the mode of display being illustrated.

As illustrated in FIGS. 2A to 2E and 4, an IC tag reader (not shown) having the first antenna ANT1 and the second antenna ANT2 is built in the main body portion 110. The IC tag reader can read, through each of the first antenna ANT1 and the second antenna ANT2, data (commodity-related information) stored in an IC tag (not shown) attached to each commodity.

The left side plate portion 120 extends from a left end of the main body portion 110 towards the customer side whereas the right side plate portion 130 extends from a right end of the main body portion 110 towards the customer side. Each of the left side plate portion 120 and the right side plate portion 130 has a shape of a rectangle with its one corner cut away, and is supported by the frame portion 150. Nothing is built in the left side plate portion 120 whereas the first antenna ANT1 is built in the right side plate portion 130. As illustrated in an enlarged view on a lower side of FIG. 4, a first shielding plate SP1 for shielding an electric wave is disposed on a rear surface of the first antenna ANT1. A surface of the right side plate portion 130 on the side of the shopping basket placing portion 160 is covered with the plastic plate 131 (FIG. 2D) so as to pass the electric wave from the first antenna ANT1.

As illustrated in FIGS. 1 and 2A to 2E, the shopping basket placing portion 160 is horizontally fixed through a shelf rest 161 to the frame portion 150 at a height position near a bottom of the right side plate portion 130. As illustrated in FIG. 4, the first reading area RA1 to read a commodity code stored in the IC tag attached to the commodity is defined in an area on the shopping basket placing portion 160. The commodity code is commodity identification information for identifying the commodity and one of the commodity-related information.

The second antenna ANT2 is built in the main body portion 110 at a height position corresponding to the left side plate portion 120 and the right side plate portion 130. On a rear surface of the second antenna ANT2, a second shielding plate SP2 for shielding the electric wave is disposed. The surface of the main body portion 110 which faces the left side plate portion 120 and the right side plate portion 130 is covered with the plastic plate 111 (FIG. 2A) so as to pass the electric wave from the second antenna ANT2. As illustrated in FIG. 4, in an area surrounded by the left side plate portion 120, the right side plate portion 130, the main body portion 110 corresponding to the left side plate portion 120 and the right side plate portion 130, and the bottom plate portion 140, the second reading area RA2 to read the commodity code stored in the IC tag attached to the commodity is formed.

In the top view of the self-service POS terminal device in FIG. 4, the first reading area RA1 and the second reading area RA2 are shown by the long-dashed double-dotted lines.

Dotted lines in FIG. 4 indicate the first antenna ANT1, the first shielding plate SP1, the second antenna ANT2, and the second shielding plate SP2.

As shown in FIG. 1, the bottom plate portion 140 is disposed between a bottom of the left side plate portion 120 and the bottom of the right side plate portion 130 by using the frame portion 150 also. On the bottom plate portion 140, a shopping bag reserving holding portion 141 is provided. In the shopping bag reserving holding portion 141, a plurality of shopping bags (checkout bags) are reserved. The customer standing in front of the self-service POS terminal device pulls out, among the plurality of shopping bags being reserved, one shopping bag at the front and brings the shopping bag into an opened state. In the shopping bag reserving holding portion 141, the shopping bag is held in the opened state so that the customer can put the commodity into the shopping bag. In FIGS. 1, 2A to 2E, and 4, the plurality of shopping bags being reserved and the shopping bag in the opened state are not illustrated.

The shopping basket placing portion 160 may be a wooden plate member and is formed at the height position near the bottom of the right side plate portion 130. The shopping basket placing portion 160 is provided at its front end with a recessed portion 160a (see FIG. 1, FIGS. 2A to 2E) for guiding a narrow portion 201 of a cart 200 (see FIGS. 5A to 5C) when the customer advances the cart 200, on which the shopping basket loaded with the commodities is mounted, to a position (predetermined position) to perform the commodity registration and the checkout. By providing the shopping basket placing portion 160 with the recessed portion 160a of a generally V shape narrowed in width towards the rear side, the narrow portion 201 is guided by the recessed portion 160a. Thus, the customer can certainly and easily advances the cart 200, on which the shopping basket loaded with the commodities is mounted, to the position to perform the commodity registration and the checkout.

FIGS. 5A, 5B, and 5C are the perspective view, the right side view, and the rear view of the cart 200 with the shopping basket 250 mounted thereto. As illustrated in FIGS. 5A to 5C, the cart 200 has the narrow portion 201, a shopping basket mounting portion 202 for mounting the shopping basket 250, a handle portion 203, and a plurality of (herein, three) wheels 204 and wheel fixing portions (leg portions) 205. The narrow portion 201 is formed between the shopping basket mounting portion 202 and the wheel fixing portions 205 and has a planar occupied area which is narrow as compared with the shopping basket mounting portion 202 and the wheel fixing portions 205.

In the meanwhile, the cart may be a cart having a shape illustrated in FIGS. 6A and 6B. The cart 300 illustrated in FIGS. 6A and 6B has a narrow portion 301, a shopping basket mounting portion 302 for mounting the shopping basket 250, a handle portion 303, a plurality of (herein, three) wheels 304, and a wheel fixing portion 305. The narrow portion 301 is formed between the shopping basket mounting portion 302 and the wheel fixing portion 305 and has a cylindrical shape.

The cart is not limited to those illustrated in FIGS. 5A to 5C and FIGS. 6A and 6B. It is sufficient that the cart has the shopping basket mounting portion, the wheels, and the wheel fixing portion(s) and has the narrow portion formed therebetween and adapted to be guided by the recessed portion 160a of the shopping basket placing portion 160.

FIGS. 7A, 7B, and 7C are the perspective view, the front view, and the right side view of the self-service POS terminal device 100, respectively, when the cart 200, on which the shopping basket 250 loaded with the commodities (not shown) is mounted, is advanced to the position (predetermined position) to perform the commodity registration and the checkout. The self-service POS terminal device 100 can read, through the first antenna ANT1 (FIG. 4) built in the right side plate portion 130, the IC tags of the commodities in the shopping basket 250 mounted on the cart 200 at the predetermined position.

FIGS. 8A, 8B, and 8C are the perspective view, the front view, and the right side view of the self-service POS terminal device 100, respectively, when the shopping basket 250 loaded with the commodities (not shown) is placed on the shopping basket placing portion 160. As illustrated in FIG. 8, the shopping basket 250 loaded with the commodities can be placed on the shopping basket placing portion 160. Even in a state where the shopping basket 250 loaded with the commodities is placed on the shopping basket placing portion 160, the self-service POS terminal device 100 can read, through the first antenna ANT1 (FIG. 4) built in the right side plate portion 130, the IC tags of the commodities in the shopping basket 250.

In FIGS. 7A to 7C and FIG. 8, FIGS. 8A to 8C, the commodities loaded in the shopping basket 250 are not illustrated. In FIGS. 7A to 7C and FIGS. 8A to 8C the plurality of shopping bags being reserved and the shopping bag in the opened state are not illustrated.

FIG. 9 is the perspective view for illustrating a state where the customer performs the commodity registration and the checkout at the self-service POS terminal device 100 after advancing, to the predetermined position, the cart 200 on which the shopping basket 250 loaded with the commodities is mounted. In FIG. 9, the commodities loaded in the shopping basket are not illustrated.

The customer advances the cart 200, on which the shopping basket 250 loaded with the commodities (not shown) is mounted, to the predetermined position to perform the commodity registration and the checkout, which has been described with reference to FIGS. 7A to 7C. Thereafter, as illustrated in FIG. 9, the customer takes out the commodities one by one or several commodities from the shopping basket 250 in the first reading area RA1 (FIG. 4) and put the commodities into the shopping bag 350 in the second reading area RA2 (FIG. 4), while visually confirming the aerial image IMG, i.e., the operation screen on which messages prompting the operations and the keys for the operations are displayed. Thus, the commodity registration is performed. After completion of the commodity registration, the noncontact IC card (not shown) is passed over the noncontact IC card reader/writer CRW to perform the checkout using an electronic money loaded on the noncontact IC card.

Figure 10:
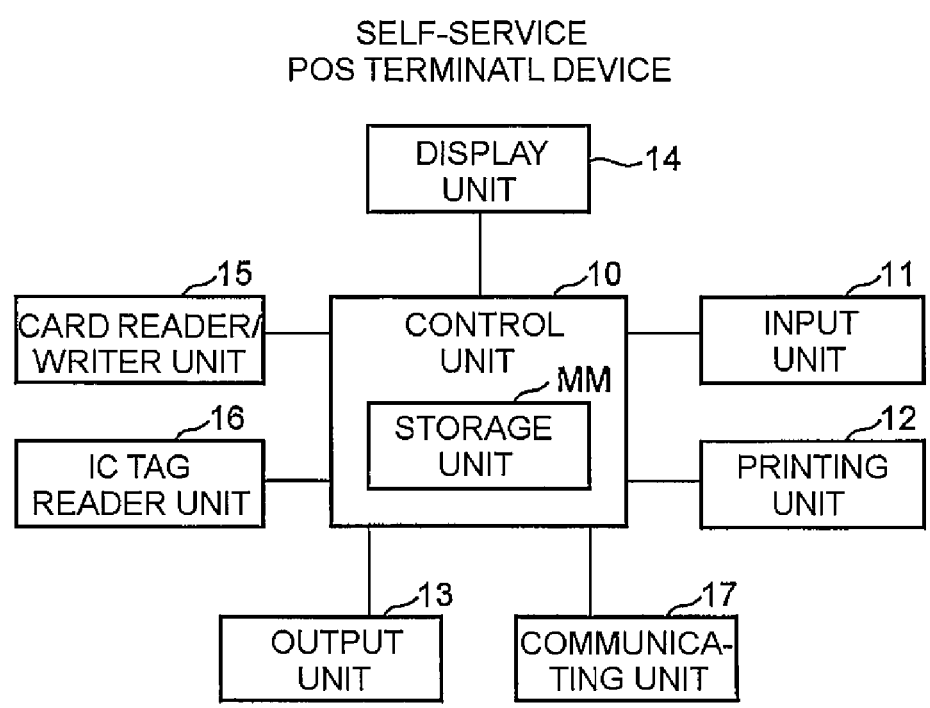
FIG. 10 is a block diagram for illustrating one example of a structure of the self-service POS terminal device.

FIG. 10 is a view for illustrating one example of an electric configuration of the self-service POS terminal device. The self-service POS terminal device 100 comprises a control unit 10 having a storage unit MM, a data input unit 11 implemented by the operation screen or the like, a data printing unit 12 implemented by a printer or the like, an output unit 13, a display unit 14, a card reader/writer unit 15, an IC tag reader unit 16, and a communicating unit 17.

The control unit 10 controls the respective units of the self-service POS terminal device. The input unit 11 enters data, for example, by pressing down the keys on the operation screen. In the above-mentioned self-service POS terminal device 100, data input by the key operation is performed by pointing, with the fingertip of the customer, a desired position on the operation screen of the aerial image IMG, and picking up an image thereof by the camera CM to recognize at which position the fingertip is. The output unit 13 produces a sound or a speech sound for confirmation of operation, guiding, alert, and so on. In the self-service POS terminal device 100 described above, the sound and the speech sound are produced from a loudspeaker not illustrated in the figure. The display unit 14 displays the messages required for the operations and the keys to perform the operations. In the above-mentioned self-service POS terminal device 100, the screen displayed on the built-in LCD 112 is displayed as the aerial image IMG through the AI plate AIP, as described with reference to FIG. 4. Herein, functions of the input unit 11 and the display unit 14 are implemented by the LCD 112 which forms the aerial image IMG, the AI plate AIP, and the camera CM.

Figure 11:
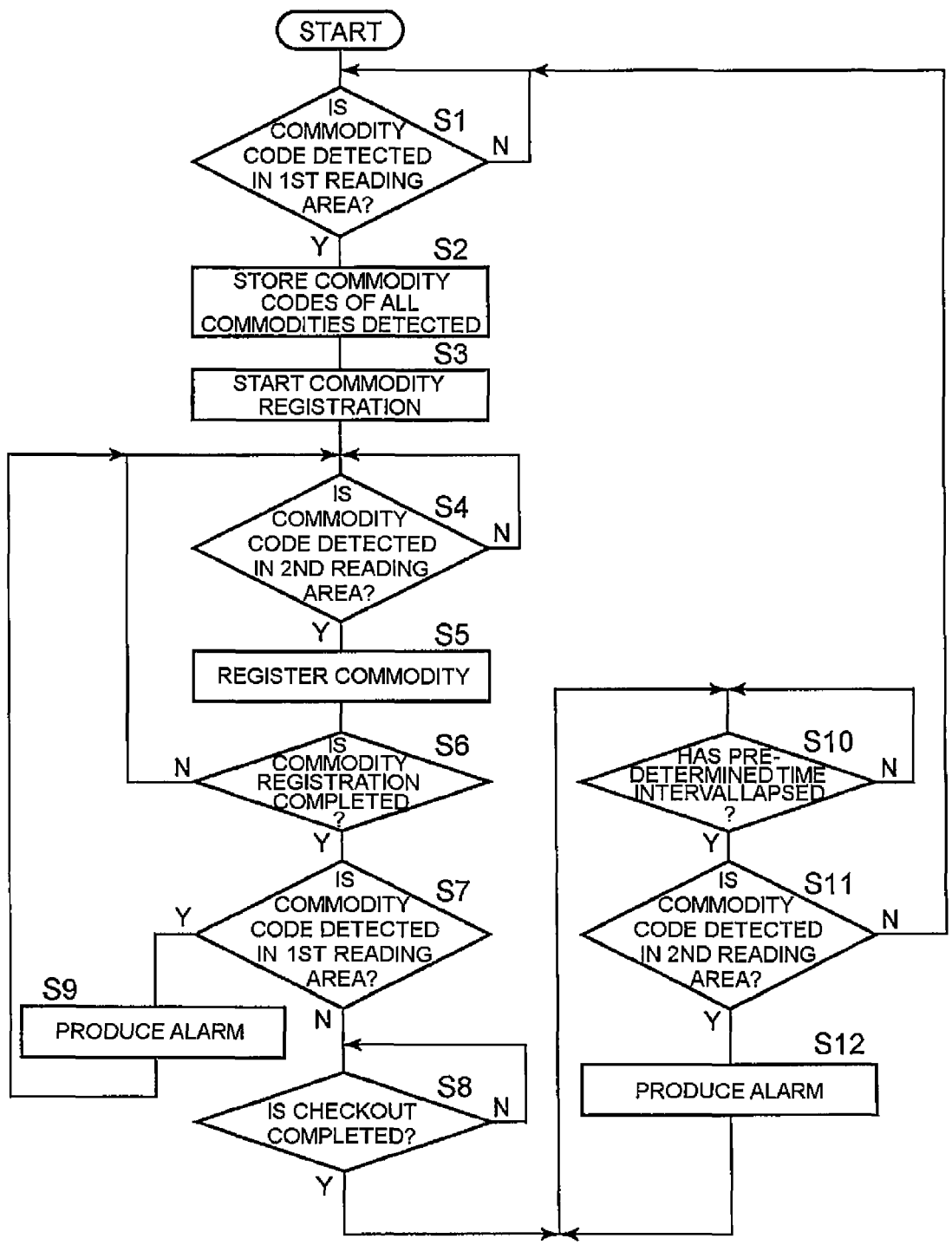
FIG. 11 is a flow chart for describing a flow of operations of the commodity registration and the checkout executed by the self-service POS terminal device.

The card reader/writer unit 15 carries out reading and writing of the noncontact IC card. In the above-mentioned self-service POS terminal device 100, the built-in noncontact IC card reader/writer CRW carries out reading and writing of the noncontact IC card. The IC tag reader unit 16 reads the data stored in the IC tag. In the above-mentioned self-service POS terminal device 100, the IC tag reader having the first antenna ANT1 and the second antenna ANT2 reads, through each of the first antenna ANT1 and the second antenna ANT2, the data memorized in the IC tag attached to each commodity. The communicating portion 17 communicates with another device, such as a shop server, via wire or wirelessly FIG. 11 is a flowchart of processing to be executed by the control unit 10 of the self-service POS terminal device 100. Hereinafter, referring to FIGS. 9 and 10 also, description will be made of the flow of processing, including the commodity registration and the checkout, executed by the control unit 10 of the self-service POS terminal device 100.

1. When the customer positions the shopping basket 250 loaded with the commodities in the first reading area RA1, the IC tag reader unit 16 detects the commodity code of each commodity. That is, in the first reading area RA1, the first antenna ANT1 emits the electric wave at predetermined time intervals (for example, one second) t1 to detect the commodity code. In a step S1, the control unit 10 determines whether or not the commodity code is detected in the first reading area RA1 through the IC tag reader unit 16. When the commodity code is detected in the first reading area RA1 (Y in the step S1), operation proceeds to a step S2. When the commodity code is not detected in the first reading area RA1 (N in the step S1), the step S1 is repeated.

2. The control unit 10 stores, in the storage unit MM, commodity codes of all commodities detected in the first reading area RA1 as a commodity code list (the step S2) and operation proceeds to a step S3. In the step S2, the first antenna ANT1 emits the electric wave in the first reading area RA1 at the predetermined time intervals to detect the commodity codes. Thereafter, until the checkout is completed, detection of the commodity codes is carried out in the first reading area RA1 at the predetermined time intervals. Every time when the commodity code is detected, the commodity code list is updated.

3. The control unit 10 starts the commodity registration and operation proceeds to a step S4 (the step S3).

4. In the step S4, the control unit 10 determines whether or not the commodity code is detected in the second reading area RA2 through the IC tag reader unit 16. When the commodity code is detected in the second reading area RA2 (Y in the step S4), the operation proceeds to a step S5. When the commodity code is not detected in the second reading area RA2 (N in the step S4), the step S4 is repeated. Herein, when the customer takes out each commodity from the shopping basket 250 and puts the commodity into the shopping bag 350 in the second reading area RA2, the commodity code of the commodity is detected through the IC tag reader unit 16. In the second reading area RA2 also, the second antenna ANT2 emits the electric wave at predetermined time intervals (for example, one second) t2 to detect the commodity codes.

5. In the step S5, the control unit 10 registers the commodity having the commodity code detected in the second reading area RA2. Upon the commodity registration, the control unit 10 refers to a PLU (Price Look Up) file stored in the storage unit MM and registers the commodity. The PLU file stores the commodity code and the commodity-related information (commodity names and unit prices, etc.) in association therewith. Without storing the PLU file in the storage unit MM, the commodity code may be transmitted through the communicating unit 17 to the shop server or the like which stores the PLU file, to acquire the commodity-related information.

6. In a step S6, the control unit 10 determines whether or not the commodity registration is completed. When the commodity registration is completed (Y in the step S6), operation proceeds to a step S7. When the commodity registration is not completed (N in the step S6), operation returns to the step S4. The commodity registration is completed when the customer operates, on the operation screen, a key for entering the completion of the commodity registration.

7. In the step S7, the control unit 10 again determines whether or not the commodity code is detected in the first reading area RA1 through the IC tag reader unit 16. When the commodity code is detected in the first reading area RA1 (Y in the step S7), operation is shifted to a step S9. When the commodity code is not detected in the first reading area RA1 (N in the step S7), the operation is shifted to a step S8. The commodity code being detected in the first reading area RA1 in the step S7 means that an unregistered commodity remains in the shopping basket 250 because the customer overlooks the commodity although the input operation of the completion of the commodity registration is carried out.

8. In the step S8, the control unit 10 determines whether or not the checkout is completed. When the checkout is completed (Y in the step S8), operation is shifted to a step S10. When the checkout is not completed (N in the step S8), the step S8 is repeated. The checkout being completed is a case where processing associated with payment of a total price of all commodities already registered is completed and a receipt is printed and discharged from the printer PRT. In the above-mentioned self-service POS terminal device 100, the noncontact IC card is passed over the noncontact IC card reader/writer CRW to perform the checkout using the electronic money loaded on the noncontact IC card.

9. In the step S9, the control unit 10 produces an alarm through the output unit 13. For example, an alarm sound or a voice message that the unregistered commodities remain in the shopping basket is sent through a loudspeaker. In this event, the control unit 10 grasps the commodity code of the unregistered, i.e., remaining commodity through the IC tag reader unit 16 and, therefore, may send the voice message with the commodity name of the remaining commodity included therein. The customer having confirmed the alarm takes out the commodity from the shopping basket 250 and puts the commodity into the shopping bag 350. As a result, the commodity code is detected in the step S4 and the commodity is registered.

10. In the step S10, the control unit 10 determines whether or not a predetermined time interval t3 has lapsed from a time instant when the completion of the checkout is determined, i.e., a time instant when the receipt is printed and discharged from the printer PRT. When the predetermined time interval t3 has lapsed (Yin the step S10), operation is shifted to a step S11. When the predetermined time interval t3 has not lapsed (N in the step S10), the step S10 is repeated. The predetermined time interval t3 is a sufficient time as a time required for the customer to take out, from the shopping bag reserving holding portion 141, the shopping bag 350 with the commodities put therein and to leave there, for example, 10 seconds. Instead of counting the predetermined time interval t3, the self-service POS terminal device 100 may be provided with a human sensor so as to determine whether or not the human sensor detects a human being. In this case, the flow is as follows. When the human sensor does not detect the human being (Yin the step S10), operation is shifted to the step S11. When the human sensor detects the human being (N in the step S10), the step S10 is repeated.

11. In the step S11, the control unit 10 again determines whether or not the commodity code is detected in the second reading area RA2 through the IC tag reader unit 16. When the commodity code is detected in the second reading area RA2 (Yin the step S11), operation is shifted to a step S12. When the commodity code is not detected in the second reading area RA2 (N in the step S11), operation returns to the step S1. Herein, the commodity code being detected in the second reading area RA2 is a case where the customer is going to leave without taking out, from the shopping bag reserving holding portion 141, the shopping bag 350 with the commodities put therein.

12. In the step S12, the control unit 10 produces an alarm through the output unit 13. For example, an alarm sound or a message that the shopping bag with the commodities put therein remains in the self-service POS terminal device is sent through a loudspeaker. The customer having confirmed the alarm takes out the shopping bag 350 from the shopping bag reserving holding portion 141 and leaves there. Operation is shifted to the step S10.

The self-service POS terminal device according to the above-mentioned embodiment exhibits the following effects.

(1) When the customer takes out the commodities from the shopping basket and put the commodities into the shopping bag, the commodity registration is carried out. Accordingly, there is no risk of causing a trouble that the checkout is performed although the unregistered commodities exist.

(2) Because the commodities are put into the shopping bag during the commodity registration, it is not necessary to bag the commodities after the checkout.

(3) The alarm is produced if the commodities remain in the shopping basket after the input operation of the completion of the commodity registration. Accordingly, there is no risk that the commodities remain in the shopping basket because the customer overlooks the commodities.

Although this invention has been described in conjunction with the preferred embodiment thereof, this invention is not limited to the foregoing embodiment.

For example, in the foregoing embodiment, the first antenna ANT1 is built in the right side plate portion 130 and the shopping basket placing portion 160 is disposed outside the right side plate portion 130 at the height position near the bottom thereof. Alternatively, the first antenna ANT1 may be built in the left side plate portion 120 and the shopping basket placing portion 160 may be disposed outside the left side plate portion 120 at the height position near the bottom thereof. In this case, it is desirable that the printer PRT and the noncontact IC card reader/writer CRW are arranged on the left side of the upper part of the main body portion 110 whereas the LCD 112, the AI plate AIP, and the camera CM are arranged on the right side of the upper part of the main body portion 110.

In the foregoing embodiment, the IC tag reader having the first antenna ANT1 and the second antenna ANT2 is used. Alternatively, two IC tag readers each of which has one antenna may be used.

In the foregoing embodiment, the commodity registration is carried out by acquiring the commodity code from the IC tag of each commodity and referring to the PLU file to obtain the commodity-related information required for the commodity registration. Alternatively, the commodity-related information required for the commodity registration may be stored in the IC tag of the commodity so as to carry out the commodity registration by directly acquiring, from the IC tag of the commodity, the commodity-related information required for the commodity registration without referring to the PLU file.

In the foregoing embodiment, only the noncontact IC card reader/writer CRW is provided for the purpose of the checkout. However, in case where the checkout is performed by cash, a bill handling device and a coin handling device may be provided. In case where the checkout is performed by a contact IC card, a contact IC card reader/writer may be provided. Furthermore, in case where the checkout is performed by a magnetic card, a magnetic card reader/writer may be provided.

In the foregoing embodiment, the display unit 14 and the input unit 11 are implemented by the build-in LCD 112, the AI plate AIP, and the camera CM. Instead, a touch panel display may be used.

INDUSTRIAL APPLICABILITY

This invention is applicable to all self-service POS terminal devices having a self-checkout function.

This application is based upon and claims the benefit of priority from Japanese patent application No. 2018-034804, filed on Feb. 28, 2018, the disclosure of which is incorporated herein in its entirety by reference.

EXPLANATION OF REFERENCE SYMBOLS 100 self-service POS terminal device
110 main body portion
120 left side plate portion
130 right side plate portion
140 bottom plate portion
141 shopping bag reserving holding portion
150 frame portion
160 shopping basket placing portion
200, 300 shopping cart
201, 301 narrow portion
250 shopping basket
350 shopping bag
IMG aerial image
CM camera
PRT printer
CRW noncontact IC card reader/writer
ANT1 first antenna
ANT2 second antenna
AIP AI plate
112 LCD RA1 first reading area
RA2 second reading area

What is claimed is:

1. A self-service POS terminal device having a first antenna and a second antenna and configured to read, through each of the first antenna and the second antenna, commodity-related information stored in an IC tag of a commodity, wherein:

the first antenna is disposed at a position to read the IC tag of the commodity loaded in a shopping basket at a predetermined position and forms a first reading area whereas the second antenna is disposed at a position to read the IC tag of the commodity taken out from the shopping basket at the predetermined position and put into a shopping bag and forms a second reading area;

each of the first antenna and the second antenna is configured to emit an electric wave at predetermined time intervals t1 and t2 in order to read the IC tag of the commodity; and the self-service POS terminal is configured to start commodity registration in response to a triggering event that the commodity-related information is read through the first antenna from the IC tag of the commodity loaded in the shopping basket at the predetermined position, and to carry out the commodity registration by reading, through the second antenna, the commodity-related information stored in the IC tag of the commodity without using the commodity-related information read through the first antenna for the commodity registration.

2. The self-service POS terminal device according to claim 1, wherein the self-service POS terminal device produces an alarm when the commodity-related information stored in the IC tag of the commodity is read through the first antenna after reception of input of completion of the commodity registration.

3. The self-service POS terminal device according to claim 1, comprising a main body portion of the self-service POS terminal device, a left side plate portion extending from a left end of the main body portion towards a customer side, and a right side plate portion extending from a right end of the main body portion towards the customer side, the first antenna being disposed inside the left side plate portion or the right side plate portion, the second antenna being disposed inside the main body portion facing the left side plate portion and the right side plate portion.

4. The self-service POS terminal device according to claim 3, comprising a bottom plate portion formed between a bottom of the left side plate portion and a bottom of the right side plate portion, a shopping bag reserving holding portion formed on the bottom plate portion to reserve a plurality of the shopping bags and to hold one of the shopping bags in an opened state, and a shopping basket placing portion formed outside the left side plate portion or the right side plate portion, which is provided with the first antenna, and configured to receive the shopping basket placed thereon.

5. The self-service POS terminal device according to claim 3 comprising a display device built in an upper part of the main body portion and configured to display an operation screen, and an AI (Aerial Imaging) plate disposed in front of the display device and configured to form an image in the air, the operation screen being displayed in the air through the AI plate.

6. The self-service POS terminal device according to claim 5, wherein the self-service POS terminal device receives input via the operation screen by picking up, with an image pickup device, an image of a fingertip of a customer on the operation screen displayed in the air and detecting a position of the fingertip of the customer on the operation screen displayed in the air.

7. The self-service POS terminal according to claim 1, wherein the self-service POS terminal device is configured to store commodity codes of all commodities as a commodity code list when the commodity codes are read through the first antenna from the IC tag of the commodities loaded in the shopping basket at the predetermined position, and to update the commodity code list until checkout for prices of the commodities for which the commodity registration is completed.

8. The self-service POS terminal device according to claim 2, wherein the alarm is a voice message including a commodity name.

9. The self-service POS terminal device according to claim 1, wherein the self-service POS terminal device is configured to produce an alarm when the commodity-related information stored in the IC tag of the commodity is read through the second antenna after a predetermined time interval t3 has elapsed from completion of checkout for a price of the commodity for which the commodity registration is completed.

* * * * *